(12) United States Patent
Spurling, III (10) Patent No.: US 10,264,818 B2
(45) Date of Patent: *Apr. 23, 2019

(54) GLOW IN THE DARK CIGAR TOOLS

(71) Applicant: George A. Spurling, III, Orlando, FL (US)

(72) Inventor: George A. Spurling, III, Orlando, FL (US)

(*) Notice: Subject to any disclaimer, the term of this patent is extended or adjusted under 35 U.S.C. 154(b) by 1071 days.

This patent is subject to a terminal disclaimer.

(21) Appl. No.: 14/490,753

(22) Filed: Sep. 19, 2014

(65) Prior Publication Data

US 2015/0000681 A1   Jan. 1, 2015

Related U.S. Application Data

(63) Continuation-in-part of application No. 13/833,472, filed on Mar. 15, 2013, now Pat. No. 9,486,012, which is a continuation-in-part of application No. 13/052,628, filed on Mar. 21, 2011, now abandoned, said application No. 14/490,753 is a continuation-in-part of application No. 13/052,628, filed on Mar. 21, 2011, now abandoned.

(51) Int. Cl.
*A24F 13/24* (2006.01)
*C09K 11/77* (2006.01)

(52) U.S. Cl.
CPC .......... *A24F 13/24* (2013.01); *C09K 11/7734* (2013.01)

(58) Field of Classification Search
None
See application file for complete search history.

(56) References Cited

U.S. PATENT DOCUMENTS

| | | | | |
|---|---|---|---|---|
| 9,486,012 B2* | 11/2016 | Spurling | ................. | A24F 13/24 |
| 2003/0007351 A1* | 1/2003 | Chen | ................... | F21V 33/0004 |
| | | | | 362/253 |
| 2005/0051183 A1* | 3/2005 | Coulthard | ............... | A24F 13/18 |
| | | | | 131/256 |
| 2005/0195591 A1* | 9/2005 | Garcia | ................... | B43L 1/006 |
| | | | | 362/118 |

* cited by examiner

*Primary Examiner* — Michael J Felton
(74) *Attorney, Agent, or Firm* — Stephen C. Thomas (57) ABSTRACT

Disclosed and claimed is a glow in the dark, size adaptable cigar splitting apparatus comprising an outer body and an inner size adapting sleeve adapted to be slidingly engaged therewith and further comprising a cutting blade for splitting the wrapper and, if present, packaging, of a cigar, cigarillo or other smoking device. In a preferred embodiment, the inner size adapting sleeve may be cylindrical in shape and is removable, allowing the invention to be adapted to various sizes of smoking devices. The improved size adaptable cigar splitter apparatus of the invention may further comprise a lanyard tang adapted to receive a necklace, lanyard, or similar structure to facilitate ease of carrying. Also claimed is a glow in the dark covering for cigar tools such as splitters, cutters and punches. Also claimed is a glow in the dark inlay for cigar tools such as splitters, cutters and punches.

20 Claims, 6 Drawing Sheets

GLOW IN THE DARK CIGAR TOOLS

CROSS REFERENCE TO RELATED APPLICATIONS

This application is a continuation-in-part of prior-filed U.S. non-provisional application Ser. No. 13/833,472, filed in the United States Patent and Trademark Office on Mar. 15, 2013, which is herein incorporated by reference in its entirety, which is a continuation in part of U.S. non-provisional application Ser. No. 13/052,628, filed with the United States Patent and Trademark Office on Mar. 21, 2011 which is herein incorporated by reference in its entirety; and this application is also a continuation-in-part of U.S. non-provisional application Ser. No. 13/052,628, filed with the United States Patent and Trademark Office on Mar. 21, 2011, which is herein incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention is the field of tools used for splitting cigar wrappers, cutting cigars, punching cigars, and the like, known as "cigar tools". Often the actions of splitting, cutting and punching cigars are performed by cigar users in order to more effectively smoke the cigar, to achieve a desired smoking experience, or to change the smokable contents of the cigar. More specifically, the invention is directly directed to glow-in-the-dark cigar tools, and glow in the dark coverings or inlays for cigar tools used for splitting cigar wrappers, cutting cigars, punching cigars, and the like. In one embodiment the invention is directed to glow-in-the-dark, size adaptable cigar splitting devices such as a cigar splitter that may be used to safely and precisely multi-purpose split the packaging and wrapper of a smoking device such as a cigar, cigarillo or similar product along the length of its axis, allowing user to empty the wrapper of its original contents, for instance, tobacco, whereupon a user by then re-fill the wrapper with a preferred smoking substance, for instance, a preferred brand or tobacco, a flavor enhancer or some other desired smoking substance. In another embodiment the invention is directed to glow in the dark coverings or inlays used on tools for splitting, cutting or punching cigars. The invention may comprise the splitting, cutting or punching tools themselves as having one or more exterior surfaces fabricated at least partially from glow in the dark materials: or alternatively the invention may comprise a covering or inlay for a cigar tool, which covering or inlay may be fabricated from flexible, rigid, semi-rigid, elastic, conformal or other coatings or coverings, which may cover or partially cover an exterior surface of tools used for cutting, splitting, or punching cigars, wherein the covering or inlay material comprises glow-in-the-dark materials. In this latter embodiment, the glow in the dark covering or inlay of the invention may be applied so as cover at least a portion of the splitter, cutter or punch and may be applied by the manufacturer of the splitter, cutter or punch, or may be applied on an after-market basis.

The glow in the dark feature of the various embodiments of the invention allows the invention to be located, seen or used in low-light conditions which are often encountered in the use of the invention, thus extending the utility of the invention and also aiding in preventing personal injury by allowing a user to more clearly see and avoid a sharp blade of the cigar tool when using it to split the wrapper of a cigar, cigarillo, or other smoking device, or to cut or punch a cigar, cigarillo, or other smoking device.

2. Background Art

Cigar smoking has become a popular past time during in recent years. As cigar smoking has gained in popularity, so too have the accessories utilized to cut and light cigars, cigarillos and like smoking devices. The proper tools for cutting and lighting cigars are perceived to enhance the cigar smoking experience. For example, many experienced cigar smokers will leave the head portion of the cigar in its finished, pre-smoked state until the cigar is ready to be smoked, in order to preserve and maximize the flavor and freshness of the cigar. Before smoking, the experienced cigar smoker may cut the finished head portion (i.e. the smoking end of the cigar which is placed in the user's mouth) of the cigar with a tool to provide a clean cut. It is well known in the art of cigar cutters to provide a guillotine style cutter which is used to clip the smoking end of the cigar. It is also known to provide a tubular cutter, or punch cutter, for forming a hole or opening in the smoking end of the cigar. Both types of cutters are well known in the art, as are v-shaped cutters, all of which provide a clean cut to ensure proper circulation through the body of the cigar when smoked.

As is commonly the case, a split along the length of a wrapper of a cigar, cigarillo or other smoking device may be desired by the user in certain situations. For various reasons, such as the insertion of flavor enhancers, easier draw, or the like, such length-wise splits in the wrapper of the smoking device are often highly desirable. However, few smokers have access to a proper tool for safely and accurately making such length-wise splits. Often pocket knives or razors are used, an obviously dangerous practice. Further, it is generally accepted that the splits should be precisely made such that the length of the cigar or cigarillo wrapper is not distorted or unnecessarily damaged. A sloppy split can easily result in an un-smokable cigar or cigarillo. Further, the wrapper on the cigar or cigarillo may be an important flavor enhancer, and may also provide an ascetic feature. A poorly made split or a poorly made splitting tool can easily ruin the wrapper of a cigar or cigarillo. With the cost of a good cigar or cigarillo often at a premium, this is an important consideration as to whether to risk ruining an expensive smoking device. The present apparatus provides a splitter that is precise, safe to both user and cigar, and compact, thus eliminating the risk associated with wrapper splitting using the familiar hand-controlled means, such as a pocket knife.

As used herein, the term "wrapper" is used to identify the outer casing or shell of a cigar which is intended generally to be smoked along with tobacco encased by the wrapper. In use, the wrapper may often be fabricated from a tobacco leaf that may be different in nature than the tobacco that forms the innermost part of the cigar. The wrapper typically is used to hold the cigar together and is typically closed on both ends in order preserve freshness until the cigar is to be used. A cigar's wrapper typically comes from the widest part of the tobacco plant. When smoked, the wrapper may determine much of the cigar's character and flavor, and as such its color is often used to describe the cigar as a whole. Over 100 wrapper shades are identified by manufacturers. As used herein, the term "packaging" refers to the plastic, paper or other package that may be used to encase a cigar for shipment and display. The packaging is typically removed before smoking. Also, while the discussion of this paragraph is directed to cigars, it is to be understood that the definitions provided herein also apply to cigarillos and other smoking devices.

BRIEF SUMMARY OF THE INVENTION

The present invention comprises an apparatus or device that has one or more of the following features, which either alone or in any combination may comprise patentable subject matter.

This invention generally relates to a novel device comprising at least one blade for splitting cigar wrappers which is adaptable to various sizes of cigars, cigarillos, and other smoking devices through the use of a removable size adapting sleeve. The improved size adaptable cigar splitting apparatus of the invention may also be used to slice through the packaging of the cigar while at the same time splitting the cigar wrapper, resulting in a savings of time and effort to the user. In a preferred embodiment, a single blade is used to perform the splitting function. The improved size adaptable cigar splitting apparatus of the invention may be fabricated from any material suitable to reliably maintain its dimension and shape in ordinary use, for example, the improve cigar splitting device of the invention may be fabricated from wood, metal, plastic, phenolic or any other similar material by any of the techniques known in the art including but not limited to molding, casting, machining, 3D printing, or any other known manufacturing process. The cigar splitter may comprise glow in the dark material, allowing it to be used in darkened environments, and preventing personal injury. The glow in the dark material as defined further herein below may be any glow in the dark material known in the art, including but not limited to any photoluminescent material or combination of materials, including but not limited to photoluminescent materials comprising strontium aluminate oxide doped with Europium.

The improved size adaptable cigar splitting apparatus of the invention is able to be manufactured with dimensions slightly larger than the outer diameter of a typical smoking device, such as for example a cigar, and is therefore small and may be lightweight enough such that it can be carried in a pocket for ease-of-use. Furthermore, a preferred embodiments of the improve cigar splitting device of the invention comprises a lanyard tang and lanyard attachment through hole which may be used to retain the improve cigar splitting device of the invention on a keychain, lanyard, necklace, string, or similar structure. Thus, the lanyard attachment feature of the improved size adaptable cigar splitting apparatus of the invention provides a feature enabling a user to reliably carry the invention in a variety of manners as the user desires.

In further alternate embodiments of the improved size adaptable cigar splitting apparatus of the invention, multiple blades may be used.

One aspect of the present invention is to provide a housing comprising a hollow cylinder and a blade disposed in the center along the length of the cylinder, such that when a user inserts a cigar, cigarillo, or other smoking device into the hollow cylinder and translates the smoking device longitudinally through the cylinder, the smoking device wrapper, and, if present, packaging, is split lengthwise thus allowing the user to remove the original contents of the smoking device and, if desired, replace the original contents of the smoking device with a preferred smoking substance such as, for instance, a premium tobacco or other smoking substance.

A further aspect of the present invention is that the cigar splitting blade comprises a cutting edge of oriented in a plane that contains the long axis of an outer housing, for cutting the wrapper of a cigar or cigarillo of a first diameter as the cigar or cigarillo is inserted through one end of the first housing and out the other end. Still further, an inner size adapting sleeve is provided which is adapted to accept a cigar or cigarillo of a second, smaller diameter, wherein the inner size adapting sleeve is further adapted to be received by the outer housing in such a fashion as to enable the cigar splitting blade to split the wrapper of a smoking device having a diameter roughly equivalent to the second, smaller diameter of the inner size adapting sleeve. In this manner, a primary aspect of the present invention is to split a cigar, cigarillo or other smoking device, which may be of varying diameter, along a chosen length of its axis.

Still another aspect of the present invention is to provide an apparatus that is safe to use for both cigar and user alike.

Yet still another aspect of the present invention is to provide an apparatus that is safe when stored.

Further embodiments of the invention comprise a covering, or, alternatively, an inlay set in an exterior surface, for a cigar tool such as any cigar splitter, cutter or cigar punch known in the art, wherein said covering or inlay covers at least a portion of an exterior surface of a cigar tool, and wherein said covering comprises any glow in the dark material, including but not limited to embodiments wherein said glow in the dark material is further defined as any photoluminescent material, which photoluminescent material may further be defined as comprising strontium aluminate oxide doped with Europium.

These together with additional aspects, features, and advantages of the improved size adaptable cigar splitting apparatus of the invention will be readily apparent to those of ordinary skill in the art upon reading the following detailed description of presently preferred, but nonetheless illustrative, embodiments of the improved size adaptable cigar splitting apparatus when taken in conjunction with the accompanying drawings.

In this respect, before explaining the various embodiments of the improved size adaptable cigar splitting apparatus of the invention in detail, it is to be understood that the improved size adaptable cigar splitting apparatus of the invention is not limited in its application to the details of construction and arrangements of the components set forth in the following description or illustration, as there are many equivalent structures all of which are included within the scope and claims of the invention. Those skilled in the art will appreciate that the concept of this disclosure may be readily utilized as a basis for the design of other structures, methods, and systems for carrying out the several purposes of the improved size adaptable cigar splitting apparatus. It is therefore important that the claims be regarded as including such equivalent constructions insofar as they do not depart from the spirit and scope of the improved size adaptable cigar splitting apparatus of the invention. It is also to be understood that the phraseology and terminology employed herein are for purposes of description and should not be regarded as limiting.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

DETAILED DESCRIPTION OF THE INVENTION

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

Tobacco companies make numerous types of cigars in terms of size, type, and flavor. However, all flavors are typically not available in all types or sizes. The apparatus of the present invention helps cut open a cigar wrapper so that a customer of a cigar company may smoke any flavor out of any type or size of cigar that he or she desires. The present inventive apparatus provides a smoker of cigars with a compact, precise tool for splitting a cigar along its axis. Furthermore, the cutter does not extend beyond the boundary of the apparatus so that it is safe to use.

As mentioned above, some users of cigars and other products for smoking find it advantageous and enjoyable to substitute the usual tobacco filling in pre-made cigars with another style of tobacco or with another smoking substance altogether, and to smoke the newly-filled cigar with the substituted filling. The present invention addresses this need by providing an apparatus for splitting cigar wrappers.

As used herein, "sliding surface" means the surfaces of inner size adapting sleeve 102 and inner size adapting sleeve receiving channel 112 that are adapted to slidingly engage as described below and depicted in the drawings.

Figure 1:
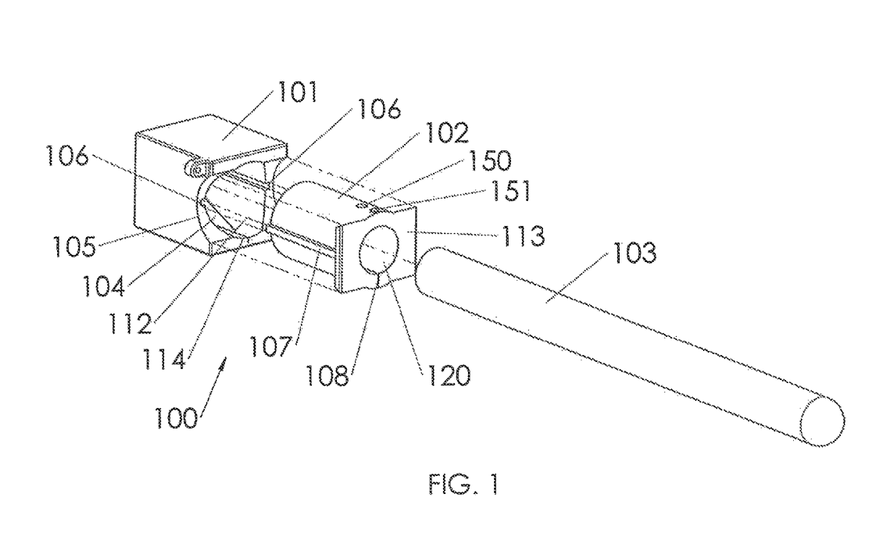
FIG. 1 depicts a perspective view of a preferred embodiment of the invention as it is used with a smoking device, such as a cigar.

Referring now to FIG. 1, a preferred embodiment of the invention is shown in perspective view. Also shown in the figure is a cigar 103. The preferred embodiment of the improved size adaptable cigar splitting apparatus of the invention 100 is comprised of outer housing 101 and inner size adapting sleeve 102 which are discussed in more detail below.

Still referring to FIG. 1, outer housing 101 is comprised of splitting blade 104, inner size adapting sleeve receiving channel 112 and at least one outer housing receiving slot 106. In the preferred embodiment of the invention shown in FIG. 1, there are two outer housing receiving slots 106 set in a substantially diametrically opposed position. Alternate embodiments of the invention may incorporate one or a plurality of outer housing receiving slots 106. It can be seen from the perspective view of the invention depicted in FIG. 1 that inner size adapting receiving channel 112 may be, in this preferred embodiment, substantially cylindrical in shape and is adapted to receive the body of inner size adapting sleeve 102, which, in the preferred embodiment shown in FIG. 1, is also cylindrical in shape. It is noted that although the preferred embodiment depicted in FIG. 1 utilizes a cylindrical shape for inner size adapting receiving channel 112 and the body of your size adapting sleeve 102, a cylindrical shape is only one of any number of shapes which may be utilized. For instance, the shape of inner size adapting receiving channel 112 in the body of inner size adapting sleeve may be elliptical cross-section, rectangular in cross-section, square in cross-section or any other cross-sectional shape which allows inner size adapting sleeve 102 to freely slide into inner size adapting sleeve receiving channel 112 with a substantially snug fit.

The improved size adaptable cigar splitting device of the invention may further comprise features to prevent the rotation of inner size adapting sleeve 102 within the inner size adapting sleeve receiving channel 112 of outer housing 101. One embodiment of such features is shown in FIG. 1 as outer housing receiving slots 106 which are adapted to be slidingly engaged with inner size adapting sleeve rail 107. It can be seen from FIG. 1 that when inner size adapting sleeve 102 is slidingly engaged into outer housing 101, inner size adapting sleeve rails 107 are slidingly engaged with and received by outer housing receiving slots 106. With the inner size adapting sleeve rails 107 thus slidingly engaged and received by outer housing receiving slots 106, inner size adapting sleeve 102 is prevented from rotating as it slides into and is retained within inner size adapting sleeve receiving channel 112 of outer housing 101.

Still referring to FIG. 1, splitting blade 104 is depicted as mounted within inner size adapting sleeve receiving channel 112. Splitting blade 104 may be attached to the inner surface of inner size adapting sleeve receiving channel 112 by any means known in the art. In the preferred embodiment depicted in FIG. 1, splitting blade 104, which may have an angled cutting edge oriented towards inner size adapting sleeve 102 as inner size adapting sleeve 102 slides into and is received by inner size adapting sleeve receiving channel 112, is affixed to an inner surface of inner size adapting sleeve receiving channel 112 by being pressed into place in a blade retaining slot 114 located in the inner surface of inner size adapting sleeve receiving channel 112 which is designed for that purpose. Thus, splitting blade 104 may be retained in blade retaining slot 114 using a press fit and, in some embodiments, may be further secured its place using adhesives, chemical bonding or any other means known in the art for attaching such structures. Still further, as inner size adapting sleeve 102 slides into outer housing 101, cutting blade 104 passes through blade clearance slot 108 in inner size adapting sleeve 102 without substantial interference.

Figure 2:
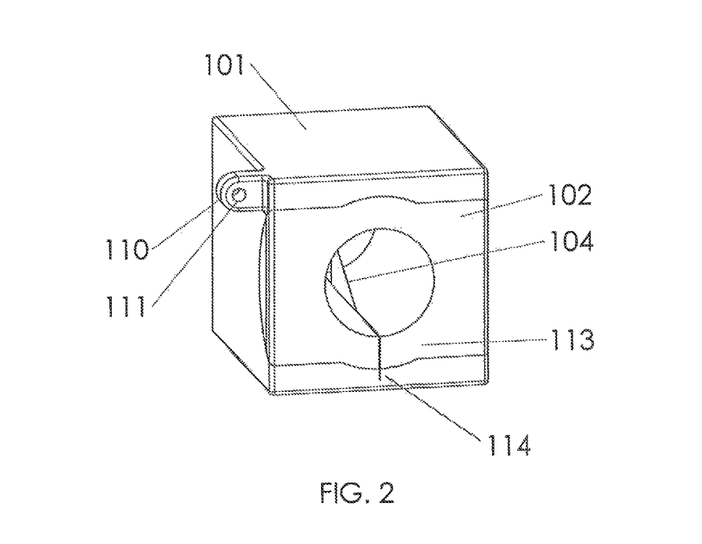
FIG. 2 depicts a perspective view of a preferred embodiment of the invention.

Still referring to FIG. 1, magnet 150 may be retained in any sliding surface of inner size adapting sleeve 102 but is preferably located on a top surface of inner size adapting sleeve 102 as shown in the drawing. Further, a magnet of opposite polarity 152 (not shown in FIG. 1), or a ferrous metal tab 153 (not shown in FIG. 1), may be disposed on a sliding surface of inner size adapting sleeve receiving channel 112, located so as to be in near enough proximity to magnet 150 when inner size adapting sleeve 102 is fully slidingly engaged as depicted in FIG. 2 such that magnet 150 retains inner size adapting sleeve 102 in place by operation of the magnetic attraction between magnet of opposite polarity 152, or ferrous metal tab 153 and magnet 150.

Still referring to FIG. 1, retaining protrusion 151 may be present on any sliding surface of inner size adapting sleeve 102 but is preferably located on a top surface of inner size adapting sleeve 102 as shown in the drawing. Retaining protrusion 151 protrudes slightly from the sliding surface and provides a press fit with the receiving sliding surface of inner size adapting sleeve receiving channel 112 as inner size adapting sleeve 102 is slidingly engaged with inner size adapting sleeve receiving channel 112. This press fit acts to retain retains inner size adapting sleeve 102 in place when inner size adapting sleeve 102 is slidingly engaged with inner size adapting sleeve receiving channel 112.

Still referring to FIG. 1, it can be seen that a cigar, cigarillo or any other smoking device 103 may be translated through inner size adapting sleeve receiving orifice 120 such that it's wrapper, and also its packaging if present, will be cut by splitting blade 104 as it passes through inner size adapting sleeve receiving orifice 120 and exits the far side of the improved size adaptable cigar splitting device of the invention. After smoking device 103 has passed through the improved size adaptable cigar splitting device of the invention, any packaging may be discarded and the smoking device wrapper may be emptied of its original contents and refilled with any smokable content desired by the user. The user will then be in possession of a smoking device which utilizes the original wrapper but is filled with new content, which may be, for example, a new or different style or flavor of tobacco or any other smoking substance the user desires.

Still referring to FIG. 1, it can also be seen that for a full-size cigar smoking devices of larger diameter, is not necessary to utilize inner size adapting sleeve 102 when using the invention. Thus, for larger smoking devices, inner size adapting sleeve 102 is not used, and the larger smoking device 103 is passed through the inner size adapting sleeve receiving channel 112 of outer housing 101, where splitting blade 104 cuts the wrapper of smoking device 103 and also its packaging, if present.

It should be noted that splitting blade 104 must be of such dimension that the leading cutting-edge protrudes into inner size adapting sleeve receiving orifice 120 far enough such that it will cut the wrapper and packaging of a smoking device 103 that is passed through inner size adapting sleeve receiving orifice 120. Thus, splitting blade 104 must protrude into inner size adapting sleeve receiving orifice 120 by dimension that is equal to or greater than the combination of the thickness of a cigar wrapper and the thickness of cigar packaging. In a preferred embodiment the protrusion of splitting blade 104 into inner size adapting sleeve receiving orifice may be on the order of at least 0.090 inches to 0.250 inches, however, alternate embodiments of the improved size adaptable cigar splitting device of the invention may comprise different protrusions.

It should also be noted that outer body 101 may be used without inner size adapting sleeve 102 for splitting smoking devices of appropriate outer dimension. Inner size adapting sleeve face flange 113 and face flange receiving recess 105 enables a preferred embodiment of the improved size adaptable cigar splitting device of the invention to take the shape of a solid when inner size adapting sleeve 102 is completely slidingly engaged with inner size adapting sleeve receiving channel 112 of our outer housing 101.

Referring now to FIGS. 1-7, either outer body 101 or inner size adapting sleeve 102, or both, may be fabricated wholly or partially from materials that comprise glow in the dark pigments or materials so that outer body 101 or inner size adapting sleeve 102, or both, may be more clearly visible to be seen by a user in low light conditions. In such low light conditions it would be advantageous to provide light in order to aid the user in locating and using the device and to prevent injury caused by the sharp blade of the device. It is anticipated that the invention may often be utilized in low light conditions such as concerts, at parties, in a vehicle at night, or in any number of other low light situations.

As used herein, "glow in the dark material" means any material that comprises a pigment or material that releases energy in the form of light and may include, for example, photo-luminescent pigments or materials, phosphorescent pigments or materials, fluorescent pigments or materials, chemi-luminescent pigments or materials, ultra violet (UV) glow pigments and materials, radioactive materials and any other pigment or material that emits light, using any process, pigment or material known in the art to emit light. "Glow in the dark material" also includes pigments or materials comprising alkaline earth metal aluminate (AEA) made from high purity inorganic materials and doped with "rare earth" metals (lanthanoids); pigments or materials comprising zinc sulfide pigments or materials; pigments or materials comprising zinc sulfide doped with a dopant such as, for example, europium such as in $SrAl_2O_4$:Eu; copper-activated zinc sulfide pigments or materials, pigments or materials comprising copper-activated zinc sulfide doped with a dopant such as, for example, europium such as in $SrAl_2O_4$:Eu; strontium aluminate pigments or materials; pigments or materials comprising strontium aluminate oxide doped with rare earth impurities such as Europium; pigments or materials comprising strontium aluminate known as SRA, SrAl, or $SrAl_2O_4$; radium pigments or materials; tritium pigments or materials; pigments or materials comprising barium sulfide; or any other material that emits light. Thus the definition of glow in the dark materials includes pigments or materials that emit light when mixed with other materials such as in glow sticks; pigments or materials that emit light for a period of time after being charged from a light source by being exposed to a light source such as for example any light source, sunlight, or an UV lights such as a black light; ultra violet (UV) glow pigments and materials that glow, or emit light in the visible spectrum, when subjected to UV light such as a black light; and pigments or materials that emit light through spontaneous radiation such as radium. Examples of ultra violet (UV) glow pigments and materials include but are not limited to UV phosphorous pigments or materials, which may emit any wavelength of visible light including but not limited to 450 nm, 420 nm, 505 nm, 510 nm, 545 nm, 590 nm, 615 nm, 500 nm, or 595 nm.

Thus, either outer body 101 or inner size adapting sleeve 102, or both, may comprise glow in the dark materials. Any of the glow in the dark materials comprising outer body 101 or inner size adapting sleeve 102 or both may be mixed with, molded into, part of, painted on, applied by way of a covering such as a wrap, or otherwise combined with the materials from which outer body 101 or inner size adapting sleeve 102 are fabricated, thus producing a glow in the dark cigar or cigarillo splitter apparatus that can be seen and used in low light conditions. In one embodiment of the invention, either outer body 101 or inner size adapting sleeve 102 individually, or both, may be fabricated from moldable plastic, and the glow in the dark pigment may be mixed into the moldable plastic before molding or machining or may be applied to an exterior surface after molding or machining as described above. Alternatively, the glow in the dark pigment or material may be painted, sprayed, dipped or otherwise applied the surfaces of comprising outer body 101 or inner size adapting sleeve 102. In such cases, only a portion of, or all of the surfaces of outer body 101 or inner size adapting sleeve 102 or both may be painted, sprayed, dipped or otherwise coated by the glow in the dark pigment or material as described herein.

Referring now to FIG. 2, a perspective view of the improved size adapting cigar splitting apparatus of the invention is shown. It can clearly be seen that the leading cutting-edge of splitting blade 104 preferably, but not necessarily, faces the direction from which inner size adapting sleeve 102 slides into outer housing 101. Also clearly shown in FIG. 2 is lanyard tang 110 and lanyard attachment hole 111, which may be but is not necessarily incorporated into a preferred embodiment of the invention. The purpose of lanyard tang 100 and lanyard attachment hole 111 is to enable the improved size adaptable cigar splitting apparatus of the invention to be retained upon a lanyard or similar structure such as a necklace, bracelet, string, chain or similar structure for ease of carrying and to prevent loss. In this manner, for instance, the improved size adaptable cigar splitting apparatus of the invention may be worn as a necklace where it may be kept handy for immediate use. Also shown in FIG. 2 inner size adapting sleeve face flange 113, which may, in a preferred embodiment, mate with and be received by face flange receiving recess 105 which may be a feature of outer housing 101. Inner size adapting sleeve face flange 113 and face flange receiving recess 105 enables a preferred embodiment of the improved size adaptable cigar splitting device of the invention to take the shape of a smooth solid when inner size adapting sleeve 102 is completely slidingly engaged with inner size adapting sleeve receiving channel 112 of outer housing 101. Such smooth appearance may be desirable for aesthetic reasons. Alternate embodiments of the improved size adaptable cigar splitting apparatus of the invention may incorporate face flanges 113 of different shape other than that shown in the figures. Blade retaining slot 114 is also shown in FIG. 2.

Figure 3:
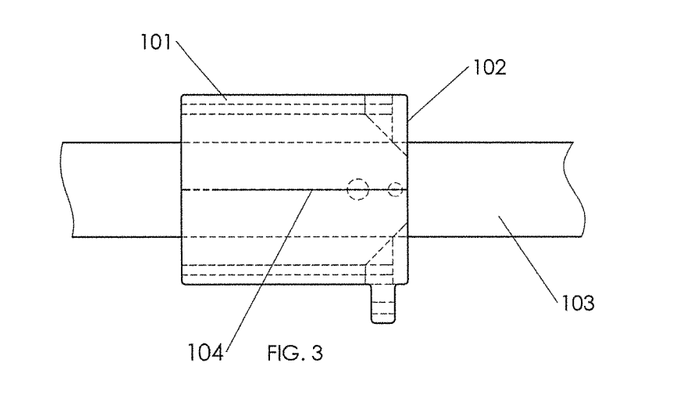
FIG. 3 depicts a side view of a preferred embodiment of the invention in use with a cigar.

Referring now to FIG. 3, a top view of a preferred embodiment of the improved size adaptable cigar splitting apparatus of the invention is shown wherein inner size adapting sleeve 102 is completely slidingly engaged with inner size adapting sleeve receiving channel 112 of outer housing 101. A smoking device 103, which may be, for example, a cigarillo, slides through inner size adapting sleeve receiving orifice 120 such that the wrapper, and packaging if present, are cut by splitting blade 104.

Figure 4:
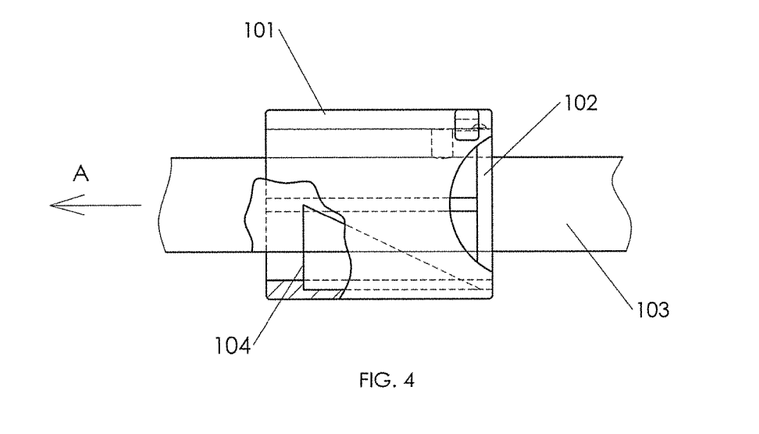
FIG. 4 depicts a cutaway side view of a preferred embodiment of the invention in use with a cigar.

Referring now to FIG. 4, a side view of a preferred embodiment of the improved size adaptable cigar splitting apparatus of the invention is shown in a view rotated 90° from FIG. 3, and where splitting blade 104 is shown in a cutaway view, and wherein inner size adapting sleeve 102 is completely slidingly engaged with inner size adapting sleeve receiving channel 112 of outer housing 101. It can be seen that smoking device 103 slides through the inner size adapting sleeve receiving orifice 120 of inner size adapting sleeve 102 in the direction shown by arrow A. When smoking device 103 moves in the direction indicated by arrow A, it can be seen that the leading cutting-edge of splitting blade 104 serves to cut the wrapper, and packaging if present, a smoking device 103, which is an intended function of the improved size adapting cigar splitting apparatus of the invention.

Figure 5:
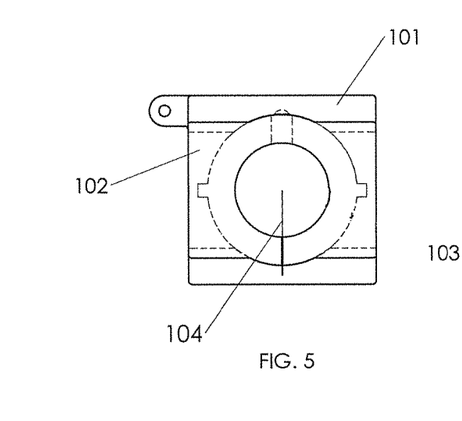
FIG. 5 depicts an end view of a preferred embodiment of the invention.

Referring now to FIG. 5 a view of a preferred embodiment of the improved size adaptable cigar splitting apparatus of the invention is shown wherein inner size adapting sleeve 102 is completely slidingly engaged with inner size adapting sleeve receiving channel 112 of outer housing 101. In this preferred embodiment, is clearly seen that splitting blade 104 protrudes into inner size adapting sleeve receiving orifice 120.

Figure 6:
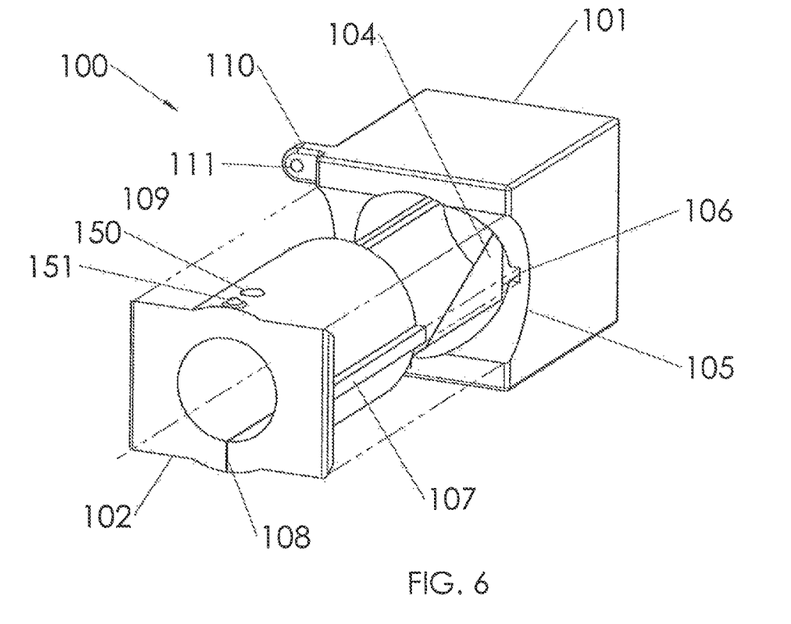
FIG. 6 depicts a perspective view of a preferred embodiment of the invention and further shows inner size adapting sleeve sliding into the outer housing of the invention.

Referring now to FIG. 6, an additional perspective view of the improved size adaptable cigar splitting apparatus of the invention is provided in which it can clearly be seen that inner size adapting sleeve rail 107 is slidingly engaged with and received by outer housing receiving slot 106 as inner size adapting sleeve 102 slides into outer housing 101. Cutting blade 104, which is, as hereinbefore mentioned attached to an inner surface of inner size adapting sleeve receiving channel 112, slides through blade clearance slot 108 in inner size adapting sleeve 102. Blade clearance slot 108 is adapted and dimensioned to allow cutting blade 104 to pass without substantial interference, enabling inner-size adapting sleeve 102 to slide into outer housing 101 without catching or otherwise substantially interfering with splitting blade 104. Also clearly shown in FIG. 6 is lanyard tang 110 and lanyard attachment hole 111, which may be incorporated into a preferred embodiment of the invention. Magnet 150 and retaining protrusion 151 are also depicted.

It should be noted, and is herein stated, that inner size adapting sleeve receiving channel 112 is of such dimension to receive cigars of typical size and shape, and likewise inner size adapting sleeve receiving orifice 120 is of such dimension to receive cigarillos of typical size and shape.

Figure 7:
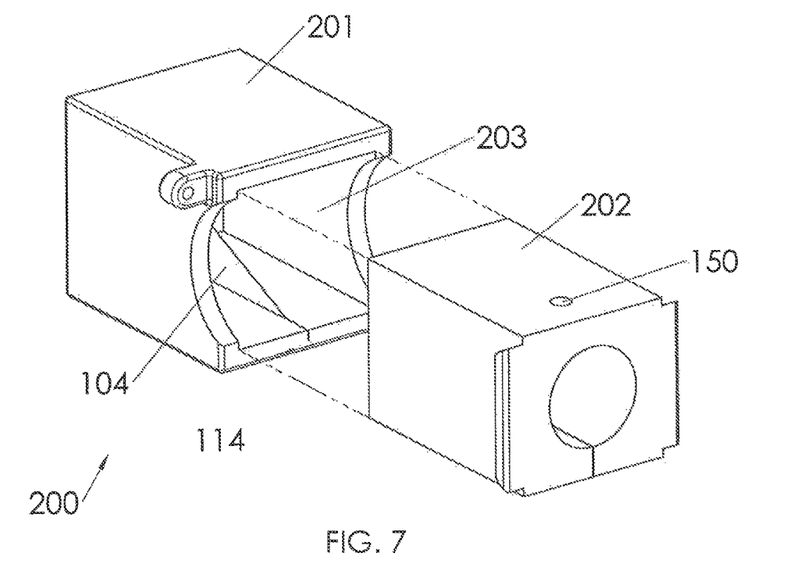
FIG. 7 depicts a perspective view of an alternate embodiment of the invention.

Referring now to FIG. 7, an alternative embodiment 200 of the improved size adaptable cigars splitting apparatus of the invention is depicted in which inner size adapting sleeve 202 is not of cylindrical shape but is rather rectilinear in shape and maybe rectangular or square in cross-section. Likewise, inner size adapting sleeve receiving channel is of similar cross-sectional shape such that it is adapted to receive inner size adapting sleeve 202 with a substantially sliding engagement, which allows inner size adapting sleeve 202 to slide into outer housing 201. In this alternate embodiment, outer housing receiving slot 106 and inner size adapting sleeve rail 107 are not included, as such features are necessary due to the fact that the rectilinear cross-section of inner size adapting sleeve 202 as received by rectilinearly shaped inner size adapting sleeve receiving channel 203 that prevents rotation of inner size adapting sleeve 202 within outer housing 201. It can thus be seen that the cross-sectional shape of the inner size adapting sleeve and inner size adapting sleeve receiving channel may be essentially any shape which allows the inner size adapting sleeve to be received by the inner size adapting sleeve receiving channel with a sliding engagement. Blade 104 is shown pressed or bonded into place.

From the foregoing discussion and the figures, it is to be appreciated that the invention's use of an inner size adapting sleeve which is designed to be slidingly received by an outer housing enables the improved size adaptable cigar splitting device of the invention to be used in conjunction with cigars, cigarillos, and other smoking devices of various outer dimension, thus making it a useful and adaptable apparatus for splitting the wrapper, and if present, packaging, of a cigar, cigarillo, or other smoking device. While specific sizes are not essential to the scope of the present invention, a preferred embodiment of the improved size adaptable cigar splitting apparatus of the invention may comprise a inner size adapting sleeve receiving channel 112 sized for splitting cigars, cigarillos, and the like having approximately one-half (½) inch diameters and an inner size-adapting sleeve 102 comprising an inner size adapting sleeve receiving orifice 120 sized for splitting cigars, cigarillos, and the like having approximately one-quarter (¼) inch diameters. Cigars and cigarillos may typically have diameters expressed as a ring gauge measurement with typical sizes including but not limited to those within the ring gauge range of 18 to 80. The scope of the present invention includes all known diameters or ring gauges.

Figures 8A, 8B:
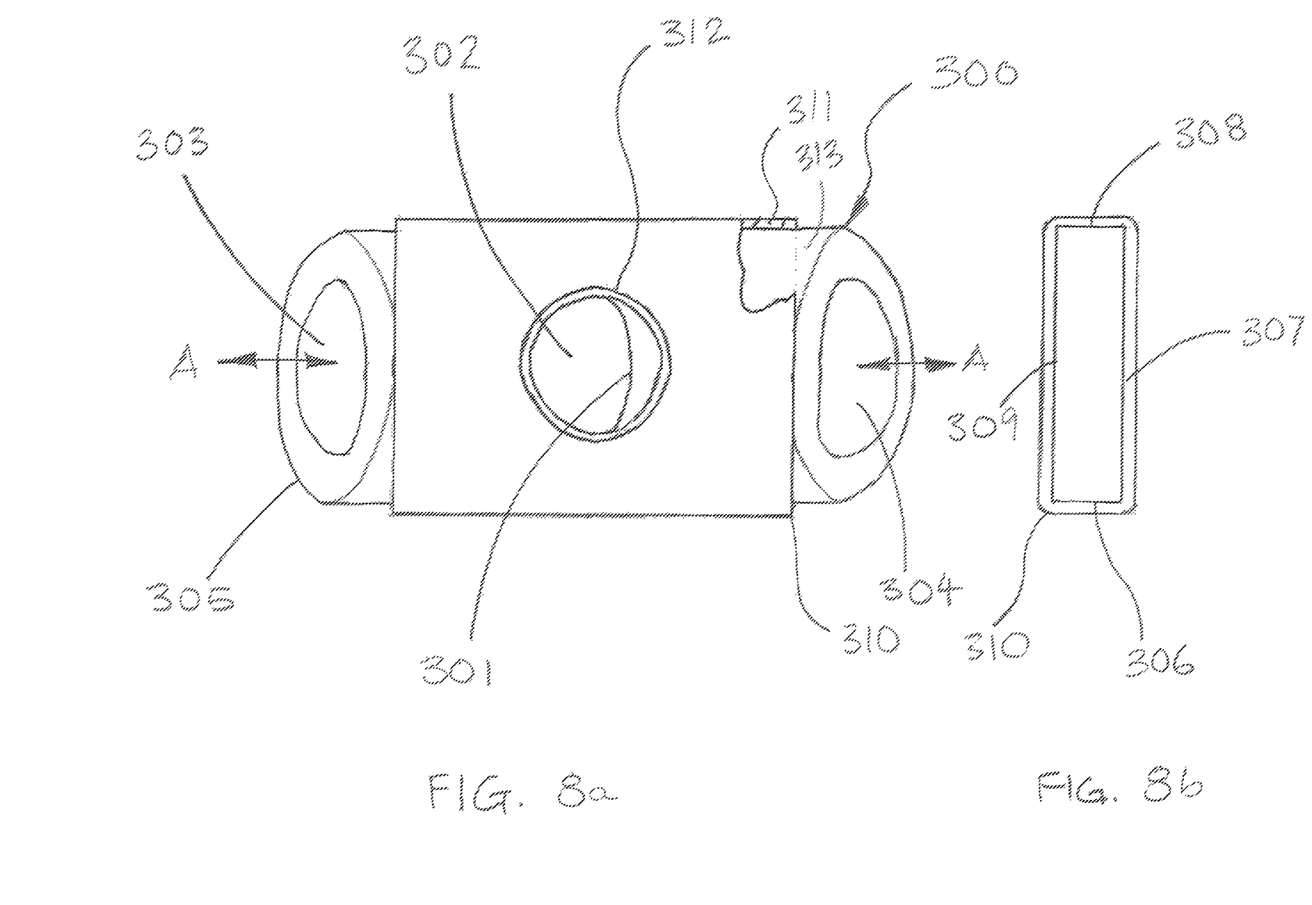
FIG. 8a depicts a side view of an embodiment of the invention comprising a cover that partially covers a cutting device for a cigar, cigarillo, or other smoking device, in which the cover is fabricated in whole or in part from glow in the dark materials.
FIG. 8b depicts an end view of an embodiment of the invention comprising a cover that partially covers a cutting device for a cigar, cigarillo, or other smoking device, in which the cover is fabricated in whole or in part from glow in the dark materials.

Referring now to FIGS. 8a and 8b, an alternate embodiment of the invention is depicted in the invention comprises a covering fabricated from glow in the dark materials that is applied onto a cutting device intended to be used for cutting cigars, cigarillos, and the like. In this alternate embodiment, the invention is a covering 310 that covers or partially covers at least a portion of cigar cutter 300. Covering 310 may take any shape desired. Cigar tool 300 may be a single or double guillotine-type cigar cutter or any other tool used for cutting or altering a cigar or cigarillo, and may further comprise a first finger opening 303 having an exterior edge 305 and a second finger opening 304 into which a user may insert finger in order to separate a first cutter blade 301 and a second cutter blade 302 which may be slidingly engaged with cigar cutter outer body 313, such that they may be moved back and forth in the cigar cutter as depicted by arrows A. A cigar, cigarillo, or other smoking device may be inserted into an opening created by the sliding apart of first cutter blade 301 and a second cutter blade 302 to a desired position, and the user may then slide first cutter blade 301 and a second cutter blade 302 closed, cutting the cigar or cigarillo at a desired position. This is typically done, for example, when it is desired to cut a cigar or cigarillo to yield a fresh cut of tobacco for an enhanced smoking experience. The glow in the dark covering 310 may comprise any rigid, semi-rigid, flexible, stretchy or elastic material known in the art that may be comprised of, combined with or coated with the glow in the dark materials described herein, and may partially or completely cover one or more exterior surfaces of cigar tool 300. For example, the covering of the invention 310 may be comprised of plastic impregnated with any of the glow in the dark materials described herein. Alternatively, the covering of the invention 310 may be comprised of heat-shrinkable materials. It is to be understood that it is within scope of the invention that the glow in the dark covering may cover any cigar tool 300 which may include cutters of any type, punches, cigar splitters or any other tool or device used to cut, punch, split or otherwise manipulate a cigar or cigarillo. The cigar tool 300 of FIGS. 8a and 8b is depicted as a cigar cutter for exemplary purposes only.

Still referring to FIGS. 8a and 8b, cigar tool 300 may comprise a plurality of exteriors surfaces such as cigar cutter first exterior surface 306, cigar cutter second exterior surface 307, cigar cutter third exterior surface 308, or cigar cutter fourth exterior surface 309. It is to be understood that cigar tool 300 may take any other shape known in the art for cigar cutters, punches or splitters. Glow in the dark covering 310 having a cross section thickness 311 may cover or partially cover at least a portion of at least one of cigar tool 300 exterior surfaces first exterior surface 306, cigar cutter second exterior surface 307, cigar cutter third exterior surface 308, or cigar cutter fourth exterior surface 309 by, for example, a compression fit, a sliding fit, be attached to any surface of cigar tool 300 by chemical bonding means or by any combination of these or by any other means known in the art. For example, glow in the dark covering 310 may comprise a hollow rigid plastic shape, open on both ends, and dimensioned so as to be adapted to slide onto or to be pressed onto cigar tool 300 whereby it may be retained by friction between the interior surfaces of glow in the dark covering 310 as they are in contact with first exterior surface 306, cigar cutter second exterior surface 307, cigar cutter third exterior surface 308, or cigar cutter fourth exterior surface 309 or, alternatively, glow in the dark covering 310 may be retained by a chemical bond between formed between the interior surfaces of glow in the dark covering 310 as they are in contact with first exterior surface 306, cigar cutter second exterior surface 307, cigar cutter third exterior surface 308, or cigar cutter fourth exterior surface 309. Glow in the dark covering 310 may further comprise a hole 312 on both sides to allow a cigar or cigarillo to be inserted into the opening created between first cutter blade 301 and a second cutter blade 302 when they are operated as describe above.

Still referring to FIGS. 8a and 8b, glow in the dark covering 310 may comprise heat shrinkable material and may cover or partially cover at least a portion of cigar cutter 300 exterior surfaces first exterior surface 306, cigar cutter second exterior surface 307, cigar cutter third exterior surface 308, or cigar cutter fourth exterior surface 309 by a compression fit wherein the pre-shrunk glow in the dark covering 310 is disposed around cigar tool 300, and then activate by application of heat or other activation means, causing glow in the dark covering 310 to shrink onto the exterior surfaces of cigar tool 300 which, for example, may be first exterior surface 306, cigar cutter second exterior surface 307, cigar cutter third exterior surface 308, or cigar cutter fourth exterior surface 309. In this case, glow in the dark covering 310 may be held in place by compressive forces between covering 310 and exterior surfaces first exterior surface 306, cigar cutter second exterior surface 307, cigar cutter third exterior surface 308, or cigar cutter fourth exterior surface 309, or may be chemically bonded onto any of the exterior surfaces of cigar tool 300.

Still referring to FIGS. 8a and 8b, glow in the dark covering 310 may comprise any glow in the dark material.

Figures 9A, 9B:
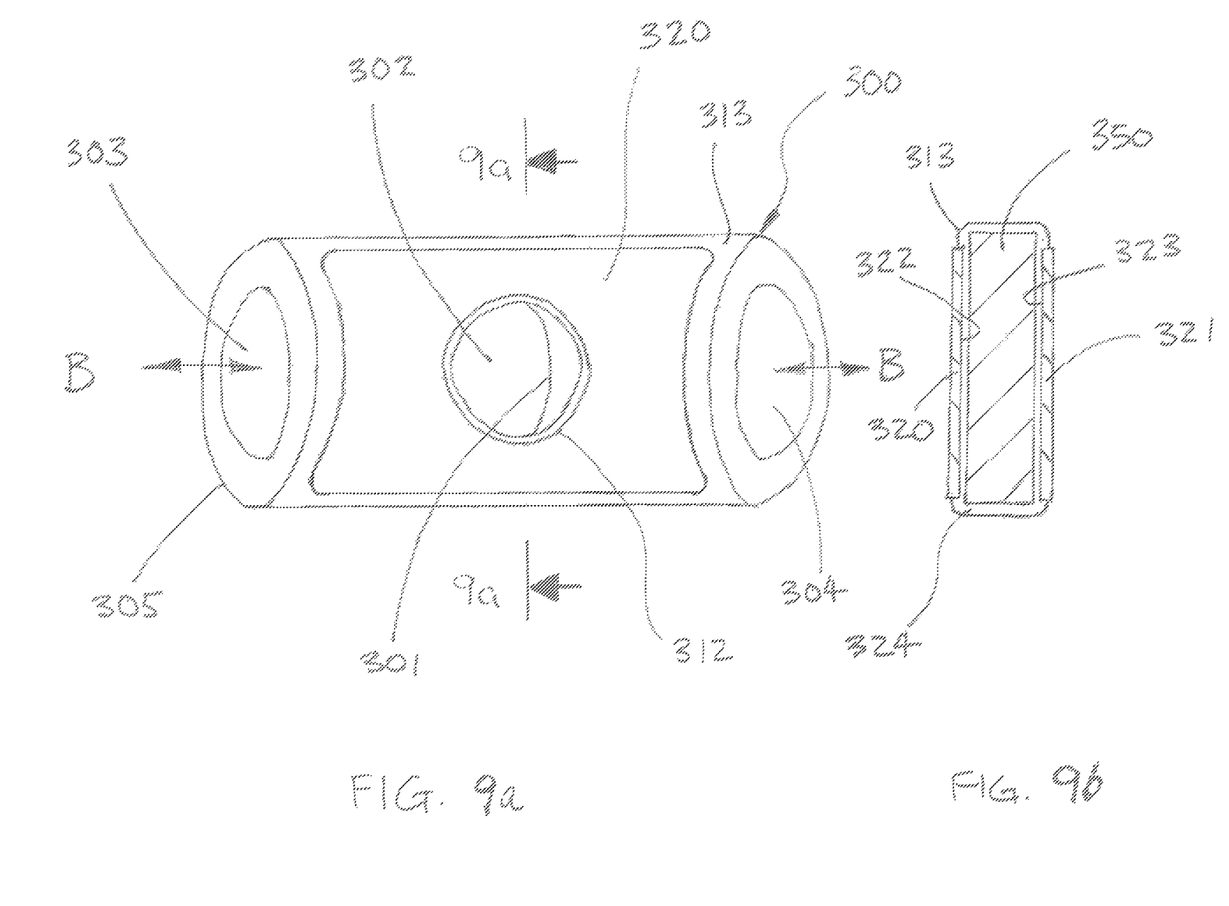
FIG. 9a depicts a side view of an embodiment of the invention comprising an inlay or applique that partially covers a cutting device for a cigar, cigarillo, or other smoking device, in which the cover is fabricated in whole or in part from glow in the dark materials.
FIG. 9b depicts an end view of an embodiment of the invention comprising an inlay or applique that partially covers a cutting device for a cigar, cigarillo, or other smoking device, in which the cover is fabricated in whole or in part from glow in the dark materials.

Referring now to FIGS. 9a and 9b, an alternate embodiment of the invention is depicted wherein the invention comprises an inlay section fabricated from glow in the dark materials that is applied onto, or inset in, an exterior surface of a cigar tool 300 intended to be used for cutting cigars, cigarillos, and the like. In this alternate embodiment, the invention is a glow in the dark inlay or applique' 320 comprising at least one glow in the dark material that may be inlaid or applied to an exterior surface of cigar cutter 300. Glow in the dark inlay or applique 320 may take any shape desired by the user: although a specific shape is shown in FIG. 9, it is to be understood that the glow in the dark inlay or applique may take any shape. Cigar tool 300 may be a single or double guillotine-type cigar cutter or any other tool used for cutting or altering a cigar or cigarillo, and may further comprise a first finger opening 303 and a second finger opening 304 into which a user may insert finger in order to separate a first cutter blade 301 and a second cutter blade 302 which may be slidingly engaged with cigar cutter outer body 313, such that they may be moved back and forth in the cigar cutter as depicted by arrows A. A cigar, cigarillo, or other smoking device may be inserted into an opening created by the sliding apart of first cutter blade 301 and a second cutter blade 302 to a desired position, and the user may then slide first cutter blade 301 and a second cutter blade 302 closed, cutting the cigar or cigarillo at a desired position. This is typically done, for example, when it is desired to cut a cigar or cigarillo to yield a fresh cut of tobacco for an enhanced smoking experience. The glow in the dark inlay or applique 320 may comprise any rigid or semi-rigid material known in the art that may be comprised of, combined with or coated with the glow in the dark materials described herein, and may partially or completely cover one or more exterior surfaces of cigar tool 300. For example, the dark inlay or applique' of the invention 320 may be comprised of plastic impregnated with any of the glow in the dark materials described herein; or, alternatively the dark inlay or applique' of the invention 320 may comprise glow in the dark paint or dye. It is to be understood that it is within scope of the invention that the glow in the dark inlay or applique of the invention 320 may be comprised may cover any cigar tool 300 which may include cutters of any type, punches, cigar cover splitters or any other tool or device used to cut, punch, split or otherwise manipulate a cigar or cigarillo. The cigar tool 300 of FIGS. 9a and 9b is depicted as a cigar cutter for exemplary purposes only.

Still referring to FIGS. 9a and 9b, glow in the dark inlay or applique 320 may comprise any glow in the dark material.

As used herein, "heat shrinkable materials" means any material which may be induced to shrink by application of heat, chemicals, radiation or other means. For example a common form of heat shrinkable material are those materials which may be described as mechanically expanded extruded plastic tube which shrinks to between one-half and one-sixth of its diameter when heated. Such materials include but are not limited to materials manufactured from a thermoplastic material such as polyolefin, fluoropolymer, polyvinylidene fluoride (PVDF), fluorinated ethylene propylene (FEP), elastomer, silicone elastomer, polyolefin, Kynar, polyvinyl chloride (PVC), neoprene, silicone elastomer, Viton or any other heat shrinkable material known in the art.

Figure 10A:
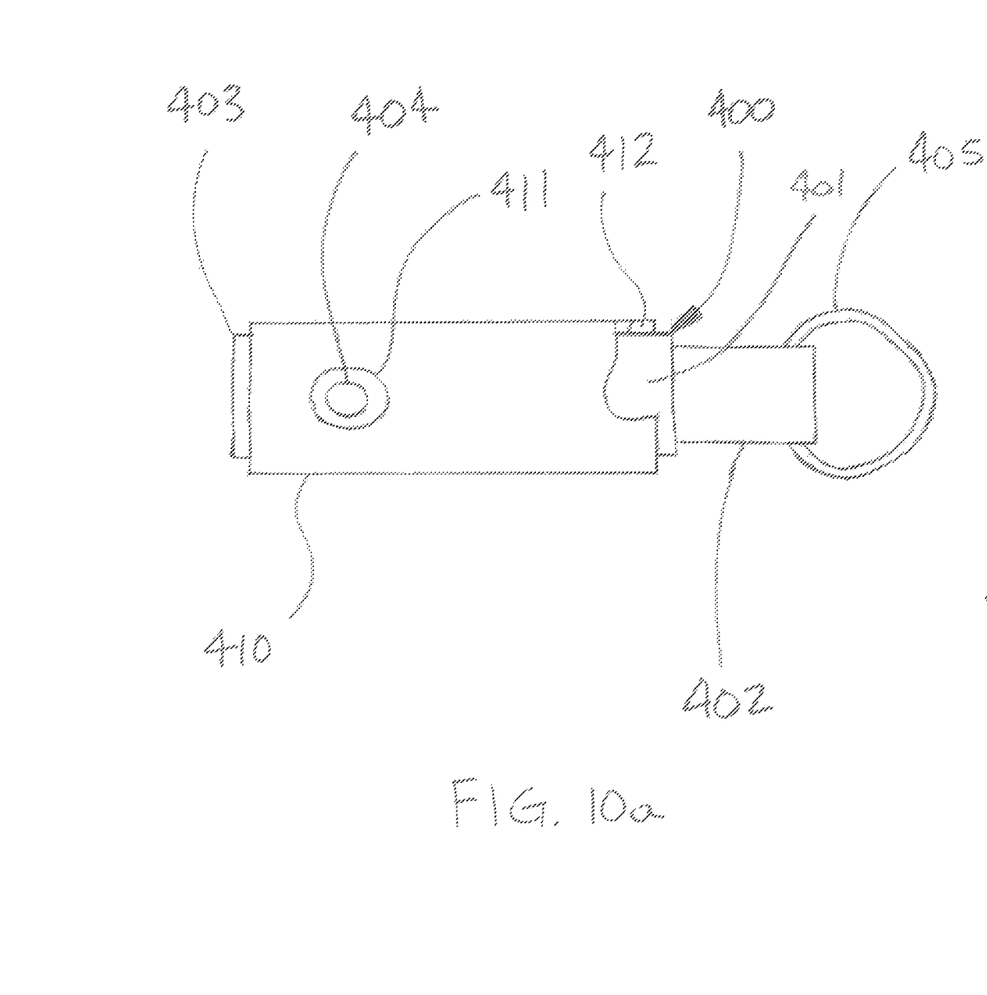
FIG. 10a depicts a side view of an embodiment of the invention comprising a cover that partially covers a punching device for a cigar, cigarillo, or other smoking device, in which the cover is fabricated in whole or in part from glow in the dark materials.
Figure 10B:
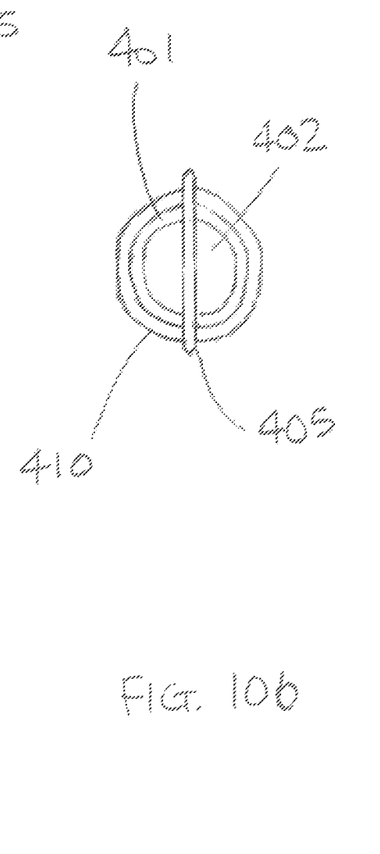
FIG. 10b depicts an end view of an embodiment of the invention comprising a cover that partially covers a punching device for a cigar, cigarillo, or other smoking device, in which the cover is fabricated in whole or in part from glow in the dark materials.

Referring now to FIGS. 10a and 10b, an alternate embodiment of the invention is depicted in the invention comprises a covering fabricated from glow in the dark materials that is applied onto a punching device intended to be used for punching cigars, cigarillos, and the like. In this alternate embodiment, the invention is a covering 410 that covers or partially covers at least a portion of cigar punch 400. Cigar punch 400 may be any tool used for punching a cigar or cigarillo, and may further comprise a spring loaded plunger 402, an outer barrel 403, and a circular or other shape punch (not shown in FIGS. 10 and 10a). Typically, the circular or other shape punch is used to cut, or "punch" a hole in the end of a cigar or cigarillo for an enhanced smoking experience. The punch operation may result in a plug comprising the punched section of the cigar being retained in the circular or other shape punch. The plug may be removed by depressed, for example, button 404 which allows the spring loaded plunger of the cigar punch to eject the plug. The glow in the dark covering 410 may comprise any rigid, semi-rigid, flexible, stretchy or elastic material known in the art that may be comprised of, combined with or coated with the glow in the dark materials described herein, and may partially or completely cover one or more exterior surfaces of cigar punch 400. For example, the covering of the invention 410 may be comprised of plastic impregnated with any of the glow in the dark materials described herein. Alternatively, the covering of the invention 410 may be comprised of heat-shrinkable materials. It is to be understood that it is within scope of the invention that the glow in the dark covering may cover any cigar tool 400 which may include cutters of any type, punches, cigar splitters or any other tool or device used to cut, punch, split or otherwise manipulate a cigar or cigarillo. The cigar punch 400 of FIGS. 10a and 10b is depicted as a Havana punch cigar punch for exemplary purposes only. It is to be understood that glow in the dark covering 410 may be applied to multi-punches, Havana punches, bullet punches or any other style or type of cigar punch.

Still referring to FIGS. 10a and 10b, cigar punch 400 may comprise a plurality of exteriors surfaces. Glow in the dark covering 410 may cover or partially cover at least a portion of at least one of cigar cutter 400 by, for example, a compression fit, a sliding fit, or by chemical bonding means or by any combination of these. For example, glow in the dark covering 410 may comprise a hollow rigid plastic shape, open on both ends, and dimensioned so as to be adapted to slide onto or to be pressed onto cigar tool 400 whereby it may be retained by friction between the interior surfaces of glow in the dark covering 410 as they are in contact with an exterior surface of punch outer barrel 401, or, alternatively, glow in the dark covering 410 may be retained by a chemical bond between formed between the interior surfaces of glow in the dark covering 410 as they are in contact with as they are in contact with an exterior surface of punch outer barrel 401.

Still referring to FIGS. 10a and 10b, glow in the dark covering 410 may comprise heat shrinkable material and may cover or partially cover at least a portion of cigar cutter 400 by covering at least a portion of exterior surface of punch outer barrel 401 by a compression fit wherein the pre-shrunk glow in the dark covering 410 is disposed around cigar punch 400, and then activated to shrink by application of heat or other activation means, causing glow in the dark covering 410 to shrink onto the exterior surfaces of cigar tool 400. In this case, glow in the dark covering 410 is held in place by compressive forces between covering 410 and exterior surface of punch outer barrel 401.

Still referring to FIGS. 10a and 10b, glow in the dark covering 410 may comprise any glow in the dark material.

In of the embodiments of the invention, the glow in the dark covering may be comprise a coating containing a glow in the dark material in which the cigar tool, which maybe cutter, punch or splitter, may be coated by painting with a brush, spraying, vapor deposition, by dipping the cigar tool be coated in a bath of liquid containing glow in the dark material, or by another method known in the art for covering a solid object with a coating.

It should also be noted that the described embodiments as depicted in the figures and as described in the specification comprise typical, exemplary embodiments of the invention. The scope and breadth of the claims cover not only those embodiments shown in the figures and described in the specification, but they cover all equivalent structures as well.

Use of the apparatus of the present invention makes changing the flavor of a cigar quick and easy. The present invention provides the convenience of two or more separate instruments in one.

INDUSTRIAL APPLICABILITY

Disclosed and claimed is a glow in the dark, size adaptable cigar splitting apparatus. In a preferred embodiment, the cigar splitter may comprise an outer body and an inner size adapting sleeve which is used to adapt the improved size adaptable cigar splitting apparatus of the invention various sizes of cigars, cigarillos, and other smoking devices. The improved size adaptable cigar splitting apparatus of the invention may further comprise a lanyard tang and attachment hole that may be adapted to receive a chain such as is worn in a necklace, a lanyard, or any equivalent structure which may be utilized to prevent loss or theft. Such an apparatus provides for utility by allowing users to both split open their smoking wrapper or sheath to replace the tobacco therein with another desired smoking substance, thus allowing a user to produce customized smoking devices of their own choosing.

What is claimed is:

1. A glow in the dark cigar splitting apparatus, comprising:
    an outer body having a channel passing there through which is adapted to receive a smoking device passing lengthwise through said channel in a sliding engagement,
    wherein said channel has an interior surface;
    wherein a blade having a cutting edge is disposed within said channel, said cutting edge of said blade protruding into said channel, and wherein said cutting edge of said blade is oriented so as to slice a wrapper of a smoking device passing through said channel; and
    wherein said outer body comprises a glow in the dark material.

2. The cigar splitting apparatus of claim 1,
    further comprising a lanyard tang, comprising a protrusion attached to said outer body, said protrusion having a through hole disposed there through.

3. The cigar splitting apparatus of claim 1,
    wherein said inner surface of said channel is further adapted to slidingly receive a size adapting sleeve; and
    further comprising a size adapting sleeve having an outer surface, wherein said size adapting sleeve outer surface is adapted to be slidingly engaged with said inner surface of said channel,
    wherein said size adapting sleeve further comprises a receiving orifice passing lengthwise through said size adapting sleeve, said receiving orifice adapted to receive a smoking device passing lengthwise through said channel in a sliding engagement,
    wherein said size adapting sleeve further comprises a slot adapted to allow passage of said blade through said size adapting sleeve as size adapting sleeve slides into said channel;
    wherein said blade is of sufficient dimension to protrude into said receiving orifice; and
    wherein said size adapting sleeve comprises a glow in the dark material.

4. The cigar splitting apparatus of claim 3,
    wherein said inner surface of said channel and said size adapting sleeve outer surface are substantially cylindrical in shape.

5. The cigar splitting apparatus of claim 3,
    wherein said inner surface of said channel and said size adapting sleeve outer surface are substantially rectilinear in cross section.

6. The cigar splitting apparatus of claim 3,
    further comprising a lanyard tang, comprising a protrusion attached to said outer body, said protrusion having a through hole disposed there through.

7. The cigar splitting apparatus of claim 4,
    further comprising a lanyard tang, comprising a protrusion attached to said outer body, said protrusion having a through hole disposed there through.

8. The cigar splitting apparatus of claim 5,
    further comprising a lanyard tang, comprising a protrusion attached to said outer body, said protrusion having a through hole disposed there through.

9. The cigar splitting apparatus of claim 3,
    wherein said size adapting sleeve further comprises a flange disposed thereon, said flange having an outer face, and wherein said flange is disposed on a face of said size adapting sleeve orthogonal to said receiving orifice and extends beyond said outer surface of said size adapting sleeve;
    and wherein said outer body further comprises a recess adapted to receive said flange such that when said size adapting sleeve is inserted into said outer body, said flange outer face is flush with an outer surface of said outer body.

10. The cigar splitting apparatus of claim 4,
    wherein said size adapting sleeve further comprises a flange disposed thereon, said flange having an outer face, and wherein said flange is disposed on a face of said size adapting sleeve orthogonal to said receiving orifice and extends beyond said outer surface of said size adapting sleeve;
    and wherein said outer body further comprises a recess adapted to receive said flange such that when said size adapting sleeve is inserted into said outer body, said flange outer face is flush with an outer surface of said outer body.

11. The cigar splitting apparatus of claim 5,
    wherein said size adapting sleeve further comprises a flange disposed thereon, said flange having an outer face, and wherein said flange is disposed on a face of said size adapting sleeve orthogonal to said receiving orifice and extends beyond said outer surface of said size adapting sleeve;
    and wherein said outer body further comprises a recess adapted to receive said flange such that when said size adapting sleeve is inserted into said outer body, said flange outer face is flush with an outer surface of said outer body.

12. The cigar splitting apparatus of claim 6,
wherein said size adapting sleeve further comprises a flange disposed thereon, said flange having an outer face, and wherein said flange is disposed on a face of said size adapting sleeve orthogonal to said receiving orifice and extends beyond said outer surface of said size adapting sleeve;
and wherein said outer body further comprises a recess adapted to receive said flange such that when said size adapting sleeve is inserted into said outer body, said flange outer face is flush with an outer surface of said outer body.

13. The cigar splitting apparatus of claim 7,
wherein said size adapting sleeve further comprises a flange disposed thereon, said flange having an outer face, and wherein said flange is disposed on a face of said size adapting sleeve orthogonal to said receiving orifice and extends beyond said outer surface of said size adapting sleeve;
and wherein said outer body further comprises a recess adapted to receive said flange such that when said size adapting sleeve is inserted into said outer body, said flange outer face is flush with an outer surface of said outer body.

14. The cigar splitting apparatus of claim 8,
wherein said size adapting sleeve further comprises a flange disposed thereon, said flange having an outer face, and wherein said flange is disposed on a face of said size adapting sleeve orthogonal to said receiving orifice and extends beyond said outer surface of said size adapting sleeve;
and wherein said outer body further comprises a recess adapted to receive said flange such that when said size adapting sleeve is inserted into said outer body, said flange outer face is flush with an outer surface of said outer body.

15. The cigar splitting apparatus of claim 1,
wherein said outer body and said size adapting sleeve are fabricated from a material selected from the group consisting of plastic, metal, wood and phenolic.

16. The cigar splitting apparatus of claim 1,
wherein said glow in the dark material is further defined as a photoluminescent material.

17. The cigar splitting apparatus of claim 16,
wherein said glow in the dark material is further defined as comprising strontium aluminate oxide doped with Europium.

18. The cigar splitting apparatus of claim 3,
wherein said outer body and said size adapting sleeve are fabricated from a material selected from the group consisting of plastic, metal, wood and phenolic.

19. The cigar splitting apparatus of claim 3,
wherein said glow in the dark material is further defined as a photoluminescent material.

20. The cigar splitting apparatus of claim 19,
wherein said glow in the dark material is further defined as a photoluminescent material comprising strontium aluminate oxide doped with Europium.

\* \* \* \* \*